UNITED STATES PATENT OFFICE.

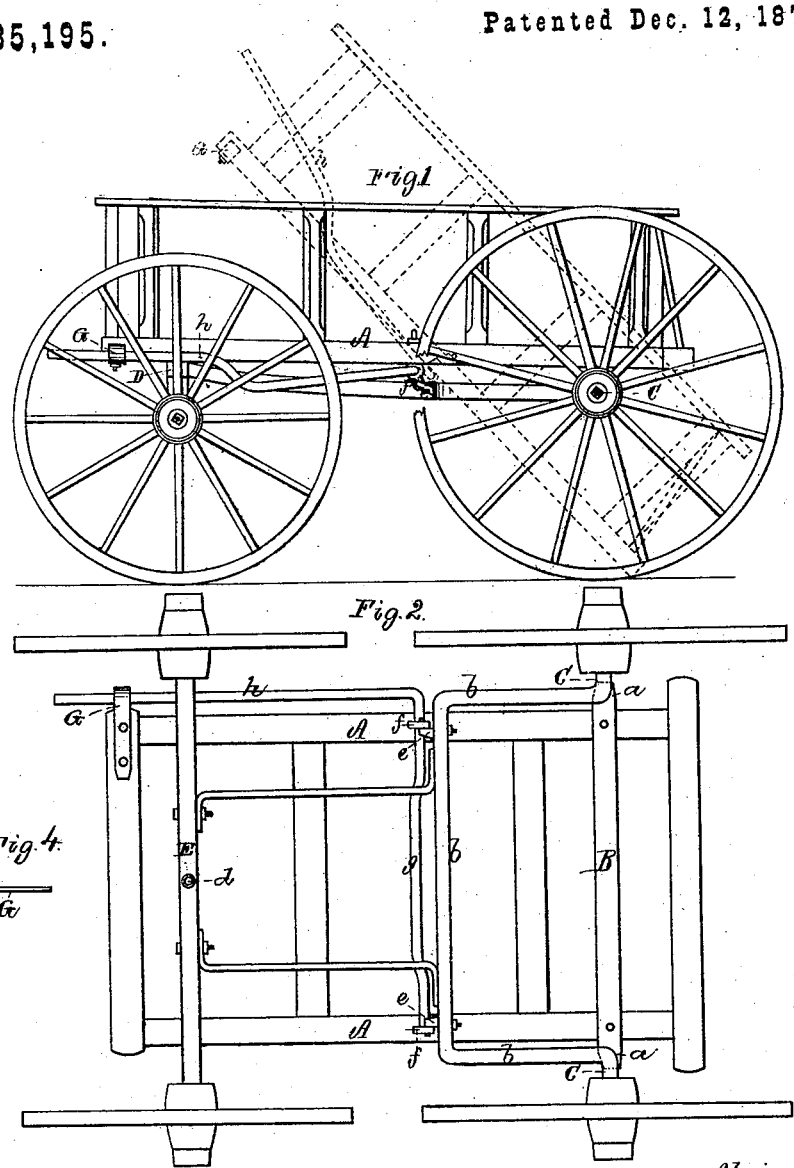
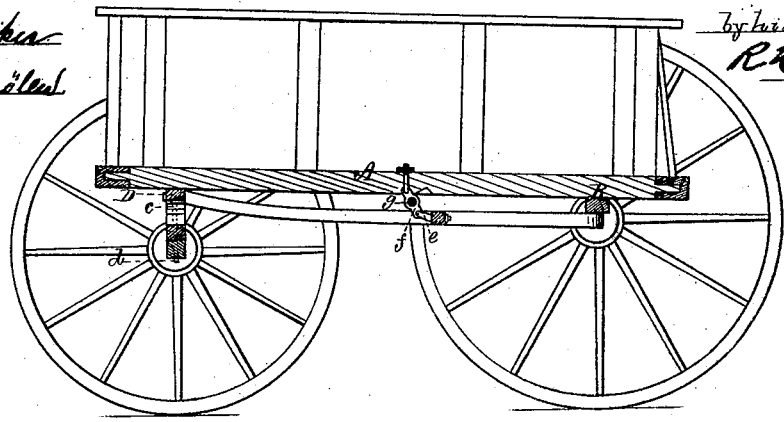

ALVIN SOULE, OF YARMOUTH, MAINE, ASSIGNOR TO HIMSELF AND HENRY W. CASWELL, OF SAME PLACE.

IMPROVEMENT IN DUMPING-WAGONS.

Specification forming part of Letters Patent No. 185,195, dated December 12, 1876; application filed June 28, 1876.

*To all whom it may concern:*

Be it known that I, ALVIN SOULE, of Yarmouth, of the county of Cumberland and State of Maine, have invented a new and useful Improvement in Dumping-Wagons; and do hereby declare the same to be fully described in the following specification and represented in the accompanying drawings, of which—

Figure 1 is a side elevation, Fig. 2 a bottom view, and Fig. 3 a longitudinal section, of a wagon with my invention, which consists, mainly, in the combination of a wagon-body, two ears, and a hooked catch with a connected perch and a cranked rear axle, and an arm, shaft, levers, and lugs, all being substantially as shown and hereinafter specified.

In the said drawings, the body of the wagon is shown at A as provided with a bar, B, extending across and projecting from it or beyond its sides, so as to form ears $a\ a$, it being arranged where the rear axle is commonly placed. The rear axle C is bell-cranked, as shown, the length of the opening of the crank $b$ being greater than the width of the body. This crank is arranged horizontally, or in, or about in, the same plane with the perch D, to which it is rigidly fastened. The front axle E is connected with the front bar $c$ of the perch in the ordinary way—that is, by a king-bolt, $d$. The connected perch and cranked rear axle, by means of lugs or suitable projections $e\ e$, are pivoted or hinged to two short levers, $f f$, fixed to a cross-shaft, $g$, provided at one end with a long arm, $h$, extending from it, as shown. The shaft goes through the middle of, and is fixed rigidly to, the two short levers $f f$, which are pivoted to the body A, and project from it, in manner as represented. Extending from the said body is a hooked catch, G. (Shown in edge view in Fig. 4, and in position in Fig. 2.) The arm $h$, being more or less elastic, can be sprung into or out of the said catch. When it is in the catch the ears $a\ a$ will be resting upon the rear axle, and will aid in supporting the body thereon; but on disengaging the arm from the catch, and raising the said arm upward, the body will be moved backward far enough to carry the ears off the rear axle, so as to admit of the body being dumped or turned back into the inclined position denoted in Fig. 1 by dotted lines. When the body is horizontal it rests on the front bar of the perch.

From the above it will be seen that the body is indirectly hinged to the connected perch and cranked axle, and is provided with a mechanism for moving it backward and forward a short distance relatively to such axle, in order to move the ears $a\ a$ either upon or off the axle.

The connected perch and cranked axle may be hinged directly to the body, and the ears or the bar B may be movable and be connected with the levers $f f$, so as to be moved by them on or off the rear axle, all of which would involve my invention, which enables a very simple, efficient, and cheap dumping-wagon to be produced.

I do not claim a dumping-wagon constructed as represented in either of the United States Patents Nos. 15,987 and 25,062.

I claim as my invention as follows:

1. The mechanism or combination for connecting the cranked axle with the body, and moving the latter back and forth on said axle, such consisting of the arm $h$, shaft $g$, levers $f f$, and lugs $e\ e$, arranged and applied as specified.

2. The combination of the wagon-body A and the ears $a\ a$ with the connected perch and cranked axle D C, and with mechanism for connecting the cranked axles with the body, and moving the latter or its ears relatively to such axle, all substantially as specified.

3. The wagon-body A, its ears $a\ a$, and catch G, in combination with the connected perch and cranked axle D C, and the arm $h$, shaft $g$, levers $f f$, and lugs $e\ e$, all being applied and to operate essentially as set forth.

ALVIN SOULE.

Witnesses:
R. H. EDDY,
J. R. SNOW.